(12) United States Patent
    Umeda

(10) Patent No.: US 11,036,097 B2
(45) Date of Patent: Jun. 15, 2021

(54) LIQUID CRYSTAL DISPLAY DEVICE AND METHOD OF MANUFACTURING THE SAME

(71) Applicant: Mitsubishi Electric Corporation, Tokyo (JP)

(72) Inventor: Hiroshi Umeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/879,615

(22) Filed: May 20, 2020

(65) Prior Publication Data
    US 2020/0393729 A1    Dec. 17, 2020

(30) Foreign Application Priority Data
    Jun. 12, 2019 (JP) ............................. JP2019-109625

(51) Int. Cl.
    G02F 1/1343 (2006.01)
    G02F 1/1335 (2006.01)
(52) U.S. Cl.
    CPC ................. *G02F 1/134363* (2013.01); *G02F 1/133528* (2013.01); *G02F 1/134372* (2021.01)
(58) Field of Classification Search
    CPC .............................................. G02F 1/134363
    See application file for complete search history.

(56) References Cited

U.S. PATENT DOCUMENTS

2008/0088568 A1*  4/2008  Haga ....................... G09G 3/18
                                                          345/100
2017/0343869 A1* 11/2017  Matsumura ....... G02F 1/133707

FOREIGN PATENT DOCUMENTS

JP          H09-318929 A      12/1997

* cited by examiner

*Primary Examiner* — Edmond C Lau
(74) *Attorney, Agent, or Firm* — Studebaker & Brackett PC

(57) ABSTRACT

An object is to provide a technique capable of increasing a display quality of a liquid crystal display device. A liquid crystal display device includes a liquid crystal panel including a liquid crystal layer with a liquid crystal, an electrode applying voltage to the liquid crystal, and a pair of polarization plates sandwiching the liquid crystal layer. A first voltage is applied to a liquid crystal in a local area in the liquid crystal panel when a transmissivity of the local area is set to a predetermined local minimum value, and a second voltage is applied to a liquid crystal in a remaining area other than the local area in the liquid crystal panel when the transmissivity of the remaining area is set to a predetermined local minimum value. The first voltage is different from the second voltage.

8 Claims, 7 Drawing Sheets

| | |
|---|---|
| ABSORPTION AXIS OF ARRAY SIDE POLARIZATION PLATE | 90° |
| ABSORPTION AXIS OF COUNTER SUBSTRATE SIDE POLARIZATION PLATE | 0° |
| EXTENSION DIRECTION OF COMB ELECTRODE | 80° |
| ORIENTATION AXIS OF LIQUID CRYSTAL | 89° |

LIQUID CRYSTAL DISPLAY DEVICE AND METHOD OF MANUFACTURING THE SAME

BACKGROUND OF THE INVENTION

Field of the Invention

The present invention relates to a liquid crystal display device and a method of manufacturing the same.

Description of the Background Art

Generally used in a liquid crystal display device is a liquid crystal panel in which a liquid crystal is sealed between an array substrate having a plurality of thin film transistors (referred to as "TFT" hereinafter) arranged on a transparent substrate and a counter substrate having a color filter (referred to as "CF" hereinafter) arranged on a transparent substrate. The TFT and a liquid crystal drive electrode connected to the TFT, for example, are arranged on an array in a matrix form on the array substrate.

Conventionally, a twisted nematic (referred to as "TN" hereinafter) mode is adopted as a liquid crystal drive system of the liquid crystal panel. In the TN mode, the liquid crystal display device is operated by directing a direction of an electric field applied to the liquid crystal sealed between the array substrate and the counter substrate, the direction being substantially perpendicular to a substrate surface, to orient molecules in a liquid crystal layer (also simply referred to as the liquid crystal hereinafter) in a vertical direction by the electric field, the liquid crystal layer originally oriented in a horizontal direction. However, in the TN mode, when the liquid crystal is oriented in the vertical direction by the electric field, the liquid crystal has a certain angle with the substrate, thus there are problems that brightness varies depending on a direction of seeing the liquid crystal panel, and a viewing angle cannot be widened.

In contrast, proposed is a lateral electric field liquid crystal display device of a fringe field switching (referred to as "FFS" hereinafter) mode or in-plane switching (referred to as "IPS" (IPS is a registered trademark)) mode, for example, in which a direction of an electric field applied to a liquid crystal is directed in a direction substantially parallel to a substrate surface and the liquid crystal is rotated in a horizontal direction by a lateral electric field. In the lateral electric field liquid crystal display device, a long axis of the liquid crystal is substantially parallel to the substrate surface, and the liquid crystal does not straighten in the direction vertical to the substrate, thus a fluctuation of the brightness at a time of changing a visual direction of seeing the liquid crystal panel is small, and a so-called view angle dependency can be reduced. Thus, the lateral electric field liquid crystal display device has a wider view angle than a liquid crystal display device of the TN mode which is a vertical electric field system, and is known as a liquid crystal display device excellent in display quality.

The lateral electric field liquid crystal panel of these FFS mode and IPS mode is operated by rotating a liquid crystal oriented in the horizontal direction, that is to say, a liquid crystal of homogeneous orientation by the lateral electric field. Absorption axis directions of a pair of polarization plates attached to outer sides of the array substrate and the counter substrate are perpendicular to each other, and an orientation axis direction of the liquid crystal (for example, the long axis direction of the liquid crystal) is arranged to be parallel to the absorption axis direction of one of the polarization plates (perpendicular to the absorption axis direction of the other one of the polarization plates).

In a state where the electric field is not applied to the liquid crystal, an electric field vibration direction of linear polarized light passing through one of the polarization plates and entering the liquid crystal layer coincides with the orientation axis direction of the liquid crystal of homogeneous orientation, thus the polarization state of the polarized light does not change after the polarized light passes through the liquid crystal layer, and the polarized light is absorbed by the other one of the polarization plates. That is to say, a transmissivity of the panel is reduced to substantially smallest, and the panel enters a black display state. Thus, the general lateral electric field liquid crystal panel of FFS mode and IPS mode is the liquid crystal panel of so-called normally black system.

SUMMARY

However, when a stress is applied to the liquid crystal panel in a process of manufacturing the liquid crystal panel of these FFS mode and IPS mode, a state where a black luminance increase, so-called black floating occurs. As a result, the black floating causes a deterioration in an in-plane distribution of the luminance and a yield decreases in some cases. Particularly, the stress on the liquid crystal panel easily occurs when a liquid crystal panel has a non-rectangular shape or a curved shape, and the in-plane distribution of the luminance tends to deteriorate.

Proposed as a method of correcting a luminance unevenness of the liquid crystal panel is a method of improving the luminance unevenness by measuring a luminance distribution and adding a correction to a drive voltage of a liquid crystal determining a transmissivity of the liquid crystal panel to compensate and adjust the distribution as is the case in Japanese Patent Application Laid-Open No. 9-318929, for example.

However, in a case of normally black characteristics which the liquid crystal panel of FFS mode and IPS mode generally has, even when the adjusted drive voltage is applied to part where the black luminance increases, the luminance cannot be sufficiently reduced in some cases. In this case, a defect of the black floating is hardly restored, and there is a problem that the display quality of the liquid crystal display device is reduced.

The present invention therefore has been made to solve the above problems, and it is an object to provide a technique capable of increasing a display quality of a liquid crystal display device.

The present disclosure is a liquid crystal display device, and includes a liquid crystal panel of normally black system including a liquid crystal layer with a liquid crystal, an electrode applying voltage to the liquid crystal, and a pair of polarization plates sandwiching the liquid crystal layer. An orientation axis direction of the liquid crystal in a case where the voltage is not applied is a direction of a homogeneous orientation, and is a direction shifted from an absorption axis direction of one of the pair of polarization plates in a direction opposite to a direction in which the orientation axis direction of the liquid crystal is rotated in a state where the voltage is applied. When a transmissivity of a local area in the liquid crystal panel is set to a predetermined local minimum value, a first voltage is applied as the voltage to the liquid crystal in the local area, and when a transmissivity of a remaining area other than the local area in the liquid crystal panel is set to a predetermined local minimum value, a second voltage is applied as the voltage to the liquid crystal in the remaining area. The first voltage is different from the second voltage.

The display quality of the liquid crystal display device can be increased.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
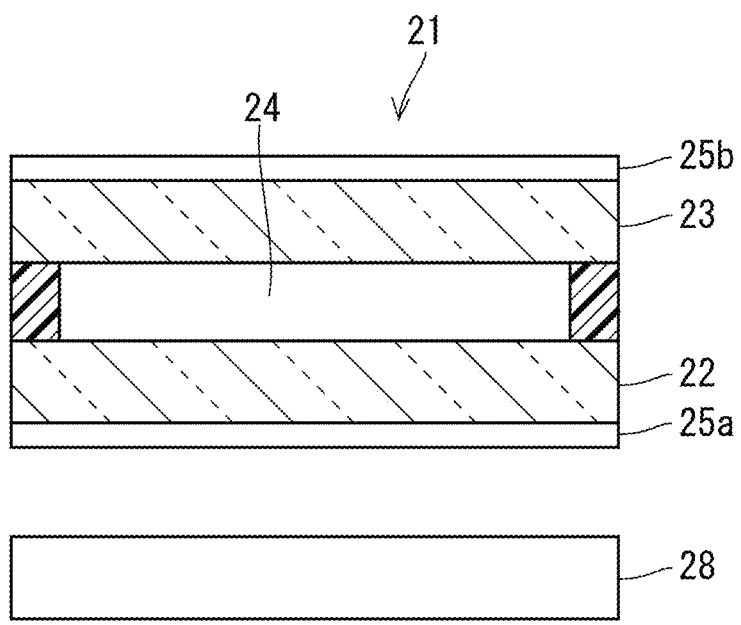
FIG. 1 is a cross sectional view schematically illustrating a configuration of a liquid crystal display device according to an embodiment 1.

FIG. 1 is a cross-sectional view schematically illustrating a configuration of a liquid crystal display device according to an embodiment 1 of the present invention. The liquid crystal display device in FIG. 1 includes a liquid crystal panel 21 and a backlight 28. The liquid crystal panel 21 includes an array substrate 22, a counter substrate 23, a liquid crystal layer 24 including a liquid crystal, and a pair of polarization plates 25a and 25.

Although details are not illustrated, the array substrate 22 includes a transparent on the transparent substrate, for example. Although details are not illustrated, the counter substrate 23 includes a transparent substrate and a color filter (CF) disposed on the transparent substrate, for example. The counter substrate 23 is disposed to face the array substrate 22. The liquid crystal layer 24 is sealed between the array substrate 22 and the counter substrate 23.

The polarization plate 25a is attached to an outer surface of the array substrate 22, and the polarization plate 25b is attached to an outer surface of the counter substrate 23. That is to say, the pair of polarization plates 25a and 25b are disposed to sandwich the liquid crystal layer 24. A backlight 28 which is a light source is disposed on a side of the polarization plate 25a of the array substrate 22. In the description hereinafter, the polarization plate 25a of the array substrate 22 is referred to as the array side polarization plate 25a and the polarization plate 25b of the counter substrate 23 is referred to as the counter substrate side polarization plate 25b in some cases.

Figure 2:
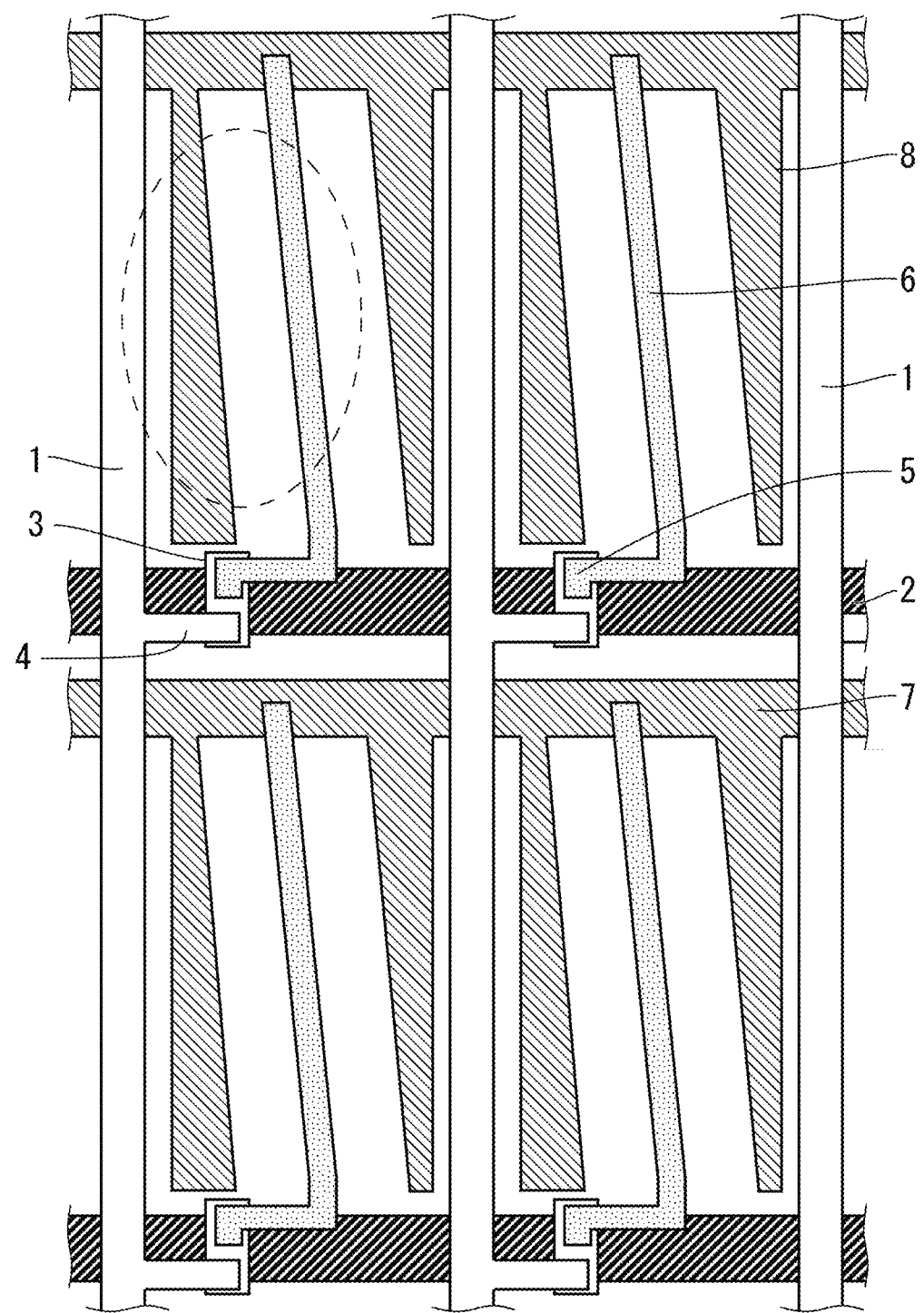
FIG. 2 is a plan view illustrating part of an array substrate in the liquid crystal display device according to the embodiment 1.

FIG. 2 is a plan view illustrating part of pixels in the array substrate 22 and enlarging a pixel region of four pixels. As illustrated in FIG. 2, the array substrate 22 includes a signal wiring 1, a scan wiring 2, a TFT 3, a pixel electrode 6, a common wiring 7, and common electrode 8.

The signal wiring 1 is a wiring for supplying, to the TFT 3, a voltage applied to the pixels, and extends in a vertical direction in FIG. 2. The scan wiring 2 is a wiring supplying, to the TFT 3, a signal for selecting the pixels to which the voltage is applied, and extends in a direction perpendicular to an extension direction of the signal wiring 1 while being insulated from the signal wiring 1. A region surrounded by the signal wiring 1 and the scan wiring 2 is defined as the pixel region.

The TFT 3 is disposed near a portion where the signal wiring 1 and the scan wiring 2 intersect with each other. The TFT 3 includes a source electrode 4, a drain electrode 5, and a semiconductor layer. The semiconductor layer in the TFT 3 is disposed on the scan wiring 2 via an insulating film in a cross-sectional view. The source electrode 4 connected to the signal wiring 1 and the drain electrode 5 connected to the pixel electrode 6 are separated from each other, and both of them are connected to the semiconductor layer in the TFT 3.

When the voltage of the scan wiring 2 is an on voltage, the TFT 3 is turned on, and the voltage of the signal wiring 1 is applied to the pixel electrode 6 via the TFT 3 (the source electrode 4, the semiconductor layer, and the drain electrode 5). In the meanwhile, when the voltage of the scan wiring 2 is an off voltage, the TFT is turned off and the voltage of the signal wiring 1 is not applied to the pixel electrode 6.

The pixel electrode 6 is disposed to face the common electrode 8 connected to the common wiring 7, and the common wiring 7 and the common electrode 8 have a U shape. One pixel electrode 6 and one common electrode 8 constitute a pair of comb electrodes, and apply the voltage (also referred to as the drive voltage in some cases hereinafter) to the liquid crystal of the liquid crystal layer 24. The liquid crystal responds to an electric field occurring between the pixel electrode 6 and the common electrode 8, thus an orientation axis direction of the liquid crystal and moreover, the transmissivity of the pixel are changed. The transmissivity of the plurality of pixels in the liquid crystal panel 21 is selectively changed, thus a desired display can be achieved in the liquid crystal panel 21.

Figure 3:
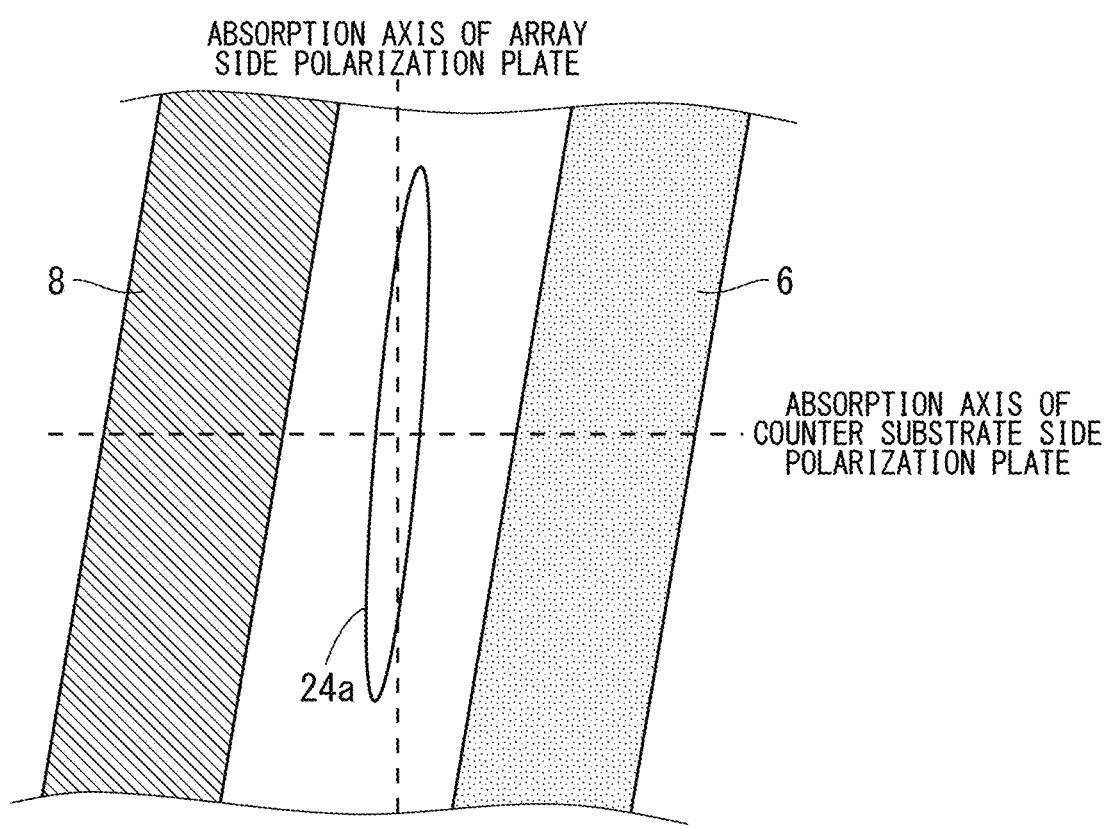
FIG. 3 is an enlarged plan view illustrating part of the array substrate in the liquid crystal display device according to the embodiment 1.

FIG. 3 is a plan view enlarging a portion surrounded by a dot line in FIG. 2. FIG. 3 illustrates a relationship in the in-plane switching mode between the comb electrodes (the pixel electrode 6 and the common electrode 8), a liquid crystal 24a of the liquid crystal layer 24, the absorption axis direction of the array side polarization plate, and the absorption axis direction of the counter substrate side polarization plate. The absorption axis direction of the array side polarization plate is the direction of the absorption axis of the array side polarization plate 25a, and the absorption axis direction of the counter substrate side polarization plate is the direction of the absorption axis of the counter substrate side polarization plate 25b.

Figures 4, 5:
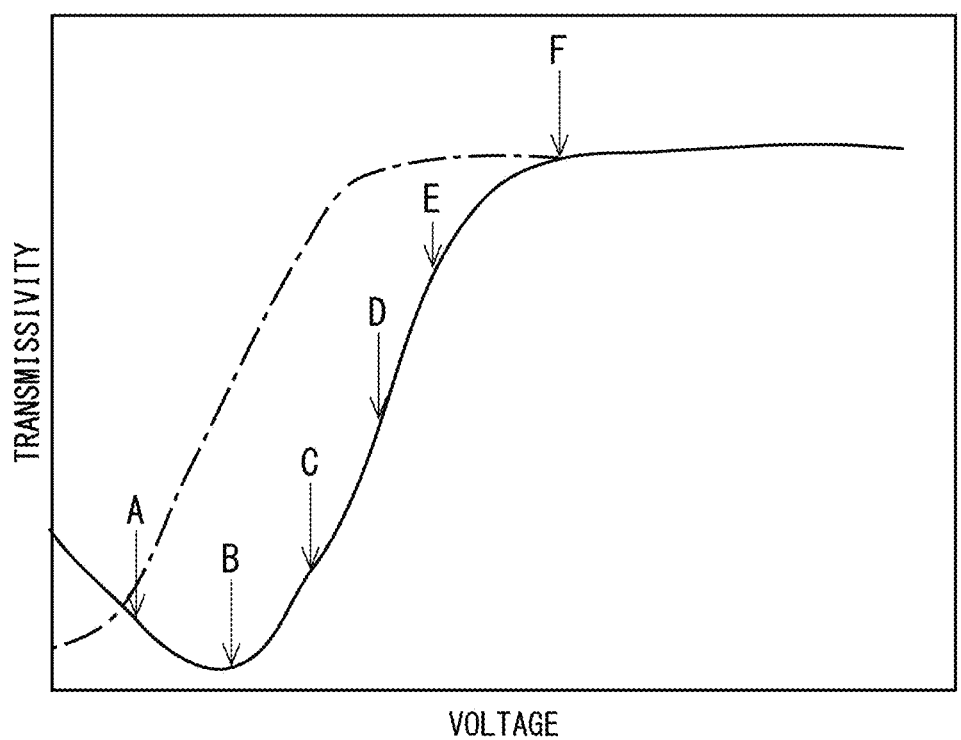
FIG. 4 is a drawing for describing a direction of each axis of a liquid crystal panel according to the embodiment 1.
FIG. 5 is a drawing for describing voltage-transmissivity characteristics of the liquid crystal panel according to the embodiment 1.

In the present embodiment 1, each orientation is set as shown in FIG. 4 where a right direction in FIG. 3 is 0° and a counterclockwise direction is a positive direction.

Herein, a general in-place switching mode is described. In the general in-plane switching mode, the absorption axis direction of the pair of polarization plates are perpendicular to each other, and the absorption axis direction of one of the pair of polarization plates and the orientation axis direction of the liquid crystal to which the electric field is not applied coincide with each other. For example, when the absorption axis direction of the array side polarization plate is 90° and the absorption axis direction of the counter substrate side polarization plate is 0°, the orientation axis direction of the general liquid crystal is designed to be 0° or 90°.

In a state where the electric field is not applied to the liquid crystal, an electric field vibration direction of a linear polarized light passing through the array side polarization plate and entering the liquid crystal layer is parallel or perpendicular to the orientation axis direction (substantially a horizontal direction) of the liquid crystal of the homogeneous orientation. Thus, the polarization state of the polarized light passing through the liquid crystal layer does not change, and the light which has passed through the liquid crystal layer is wholly absorbed by the counter substrate side polarization plate. Thus, the liquid crystal panel described above has the lowest transmissivity when the voltage is not applied between the comb electrodes, and enters the black display state to be a liquid crystal panel of so-called normally black system.

Also in the liquid crystal panel 21 according to the present embodiment 1, the orientation axis direction of the liquid crystal 24a in the case where the voltage is not applied is the same as the direction of the homogeneous orientation (substantially the horizontal direction) in the manner similar to an optical design in the general in-plane switching mode described above. However, in the liquid crystal panel 21 according to the present embodiment 1, differing from the optional design in the general in-plane switching mode, the absorption axis direction of one of the pair of the polarization plates 25a and 25b and the orientation axis direction of the liquid crystal to which the electric field is not applied do not completely coincide with each other.

Particularly, the orientation axis direction of the liquid crystal 24a in the state where the voltage is not applied is slightly shifted from the absorption axis direction of one of the polarization plates of the pair of the polarization plates 25a and 25b in a direction opposite to a direction in which the orientation axis direction of the liquid crystal 24a is rotated in the state where the voltage is applied. In the example in FIG. 4, a deviation of angle of 1° is provided between the orientation axis direction of the liquid crystal 24a and the absorption axis direction of the array side polarization plate 25a (transmission axis direction of the counter substrate side polarization plate 25b).

Since the liquid crystal 24a is rotated in the positive direction when the voltage is applied between the comb electrodes, the orientation axis direction of the liquid crystal 24a gets closer to the absorption axis direction of the array side polarization plate 25a until the voltage increase to a certain level or more, and the transmissivity of the liquid crystal panel 21 decreases. Thus, as shown by a solid line in V-T characteristics (voltage-transmissivity characteristics) in FIG. 5, the transmissivity of the liquid crystal panel 21 has a local minimum value when the voltage applied to the liquid crystal 24a has a value other than 0. The characteristics herein are slightly deviated from characteristics shown by an alternate long and short dash line in FIG. 5, that is to say, the general normally black characteristics having the smallest transmissivity in the case where the voltage applied to the liquid crystal 24a has the value of 0.

Thus, when the transmissivity of almost a whole area in the liquid crystal panel 21 is set to a predetermined local minimum value, the liquid crystal display device according to the present embodiment 1 applies a voltage B which is not 0 in FIG. 5 to the liquid crystal 24a in the area. The predetermined local minimum value of the transmissivity is a value corresponding to a local minimum value of an actual transmissivity, and is a value set in manufacturing a liquid crystal panel, for example. In this manner, the black luminance in the area is minimized by applying the voltage B to almost the whole area in the liquid crystal panel 21.

Figure 6:
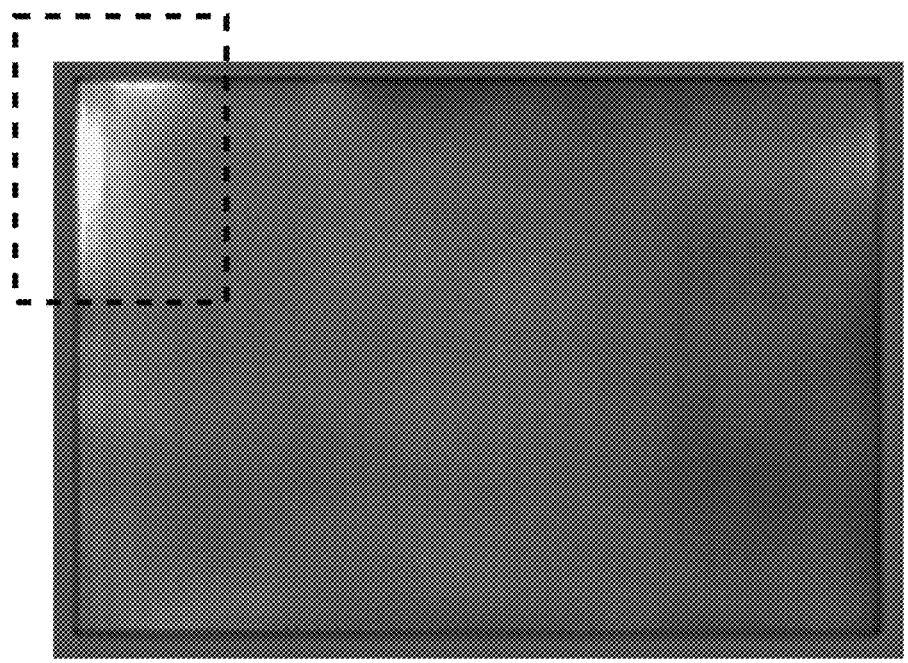
FIG. 6 is a drawing illustrating an example of a luminance distribution of the liquid crystal panel according to the embodiment 1.

Herein, illustrated in FIG. 6 is a luminance distribution in a case where the liquid crystal panel 21 is generated and the voltage B is applied to the whole area in the liquid crystal panel 21 tentatively. FIG. 6 exaggeratingly illustrates a change of the luminance somewhat. As illustrated in FIG. 6, there is an area where the black luminance increases by a stress unevenness, for example, that is to say, an area where the black floating occurs around an upper left corner shown by a dot line in the liquid crystal panel 21.

Figure 7:
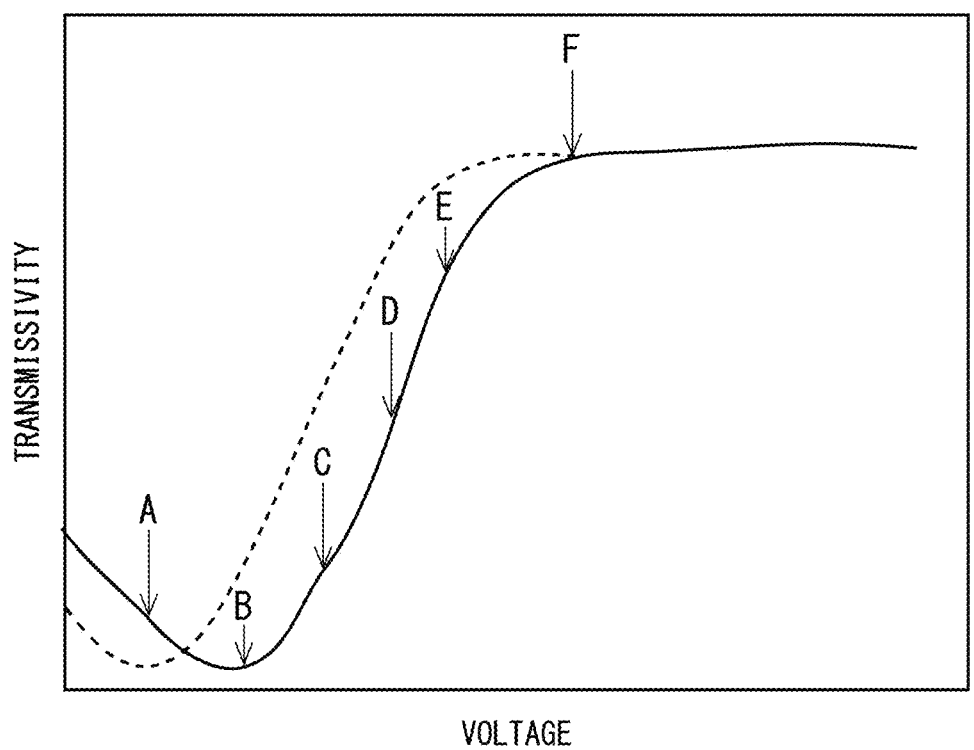
FIG. 7 is a drawing for describing the voltage-transmissivity characteristics of the liquid crystal panel according to the embodiment 1.

FIG. 7 is a drawing illustrating the V-T characteristics (dot line) in an area where the black floating occurs in the liquid crystal panel 21 and the V-T characteristics (solid line) where the black floating does not occur in the liquid crystal panel 21. As illustrated in FIG. 7, the V-T characteristics in the area where the black floating occurs are different from the V-T characteristics in the area where the black floating does not occur, and are the characteristics in which the voltage of the V-T characteristics in the area where the black floating does not occur is substantially slid. The orientation axis direction of the liquid crystal 24a in the case where the voltage is not applied is set so that the smallest value of the transmissivity is equal to the local minimum value of the transmissivity in both the V-T characteristics in the area where the black floating occurs and the V-T characteristics in the area where the black floating does not occur.

In the liquid crystal display device according to the present embodiment 1, the area of the black floating detected in manufacturing the liquid crystal panel, for example, is set as a local area. Then, the liquid crystal display device applies a voltage A (first voltage) in FIG. 7 as a drive voltage to the liquid crystal 24a in the local area when the transmissivity of the local area is set to the predetermined local minimum value, and applies the voltage B (second voltage) in FIG. 7 as a drive voltage to the liquid crystal 24a in a remaining area other than the local area when the transmissivity of the remaining area is set to the predetermined local minimum value. Herein, the voltage A is different from the voltage B, and is smaller than the voltage B in the example in FIG. 7.

According to such a configuration, each of the black luminance in the local area and the black luminance in the remaining area can be minimized, thus the black luminance in the whole area can be minimized. The black luminance can be equalized, that is to say, the in-plane distribution of the black luminance at the time of the black display can be suppressed.

The liquid crystal display device according to the present embodiment 1 has a configuration of using the characteristics shown by the dot line in FIG. 7 in the local area and using the characteristics shown by the solid line in FIG. 7 shifted from the characteristics shown by the dot line in FIG. 7 in the remaining area so that the transmissivity of the local area can be optimized even when the transmissivity has a value other than the local minimum value. Such a configuration can be achieved when the liquid crystal display device includes a data signal storage element (not shown) storing a drive voltage (data signal) corresponding to a gradation display from white color toward black color in a rewritable form in each of the local area and the remaining area in the panel surface, for example.

<Description of Manufacturing Method>

Described subsequently is a method of manufacturing the liquid crystal display device and the liquid crystal panel 21 according to the present embodiment 1 described above.

In manufacturing the liquid crystal display device according to the present embodiment 1, manufactured firstly is the liquid crystal panel 21 having the directions described above as the extension direction of the comb electrode, the orientation axis direction of the liquid crystal 24a, the absorption axis direction of the array side polarization plate, and the absorption axis direction of the counter substrate side polarization plate. A black floating inspection process and a determination process of determining an optimal black display voltage described hereinafter are performed on the liquid crystal panel 21 for setting the black display voltage in the panel surface.

In the black floating inspection process, the voltage B is applied to the liquid crystal in the whole area in the liquid crystal panel 21 to make the liquid crystal panel 21 perform the black display in a module state, and a presence or absence of the occurrence of the stress unevenness (black floating) is inspected. Specifically, the luminance is measured in a plurality of partial areas in the whole area in the liquid crystal panel 21, and the presence or absence of the occurrence of the stress unevenness (black floating) is inspected in accordance with an inspection result whether or not there is a partial area where the measured luminance is beyond a predetermined range regarding the black luminance.

The determination process of determining the optimal black display voltage is performed on the partial area where the stress unevenness (black floating) confirmed in the black floating inspection process occurs in the liquid crystal display device in which the occurrence of the stress unevenness (black floating) is confirmed. The partial area where the stress unevenness (black floating) confirmed in the black floating inspection process occurs is set as the local area described above. The partial area where the stress unevenness (black floating) confirmed in the black floating inspection process occurs is also referred to as the occurrence area in some cases in the following description. Thus, the partial area where the stress unevenness (black floating) confirmed in the black floating inspection process occurs, the local area, and the occurrence area are substantially the same in the following description.

In the determination process of determining the optimal black display voltage, a plural magnitudes of voltage ranging from the voltage B to the zero voltage is applied in sequence to the liquid crystal in the occurrence area while measuring the black luminance in the occurrence area. For example, the voltage changed from the voltage B toward a lower voltage by 0.1 mV is applied to the liquid crystal in the local area as a manner of applying such a voltage.

The voltage having the smallest black luminance is determined as the optimal black display voltage (the voltage A in FIG. 7). It is also applicable to measure the black luminance in all the magnitudes of voltage changed from the voltage B to the zero voltage by 0.1 mV for determining the voltage in which the black luminance gets smallest and determine the voltage in which the black luminance gets smallest to be the optimal black display voltage. It is also applicable that the voltage is changed from the voltage B toward a lower voltage by 0.1 mV until the change in the black luminance is turned from fall to rise for determining the voltage in which the black luminance gets smallest and when the change in the black luminance is turned from fall to rise, a voltage in which the black luminance gets smallest in the voltage before the rise and the voltage after the rise is determined to be the optimal black display voltage.

Exemplified in the determination process of determining the optimal black display voltage described above is a case of uniformly determining the optimal black display voltage in all the occurrence areas on an assumption that the luminance increases substantially uniformly in all the occurrence areas for simplifying the description. However, a difference in the actual stress unevenness and moreover, a difference in the degree of increase in the black luminance is recognized in many cases in all the occurrence areas. Thus, it is also applicable to divide all the occurrence areas confirmed in the black floating inspection process into a plurality of minute areas, which of which is smaller than the partial area, determine the determination process of determining the optimal black display voltage described above for each of the divided minute areas, and determine the optimal black display voltage for each of the divided minute areas.

In addition to the process described above, when voltage changed from the optimal black display voltage (the voltage A in FIG. 7) toward a high voltage by 0.1 mV is applied to the liquid crystal in the occurrence area while measuring the black luminance in the occurrence area, for example, the voltage appropriate for each gradation display in the occurrence area can be determined. As a result, data of the V-T characteristics in the occurrence area shown by the dot line in FIG. 7 can be obtained. The liquid crystal display device in which the obtained data of the V-T characteristics is stored in the data signal storage element described above determines the drive voltage based on the data of the V-T characteristics, thereby being able to perform a desired gradation display selected from the plural types of gradation display (transmissivity) in a relatively large range in the occurrence area (local area).

The data of the V-T characteristics may be obtained in each of the plurality of minute areas described above. In this case, the liquid crystal display device determines the drive voltage based on the data of the V-T characteristics, thereby being able to perform a desired gradation display selected from the plural types of gradation display (transmissivity) in a relatively large range in the minute area.

Conclusion of Embodiment 1

According to the present embodiment 1 described above, the first voltage is applied as the voltage to the liquid crystal in the local area when the transmissivity of the local area is set to the predetermined local minimum value, and the second voltage is applied as the voltage to the liquid crystal in the remaining area other than the local area when the transmissivity of the remaining area is set to the predetermined local minimum value. The first voltage is different from the second voltage. According to such a configuration, the minimization of the black luminance in the whole area in the liquid crystal panel 21 and the suppression of the in-plane distribution of the black luminance can be achieved, thus the display quality of the liquid crystal display device can be increased.

The liquid crystal panel 21 is not limited to the liquid crystal panel of in-plane switching mode, however, a lateral electric field liquid crystal panel is also applicable. For example, the liquid crystal panel 21 may be a liquid crystal panel of FFS mode which is a type of lateral electric field liquid crystal panel including an upper layer electrode with a slit and a lower layer electrode having a planar shape.

According to the manufacturing method in the present embodiment 1, the local area is determined based on the distribution of luminance in the whole area in the case where the second voltage is applied to the liquid crystal in the whole area in the liquid crystal panel 21. Then, the first voltage is determined based on the change in the transmissivity of the local area with respect to the change in the voltage applied to the liquid crystal in the local area. According to such a manufacturing method, the liquid crystal display device in which the in-plane distribution of the black luminance is suppressed can be manufactured with a high yield even when the presence or absence of the occurrence of the stress unevenness (black floating) and the occurrence area are varied.

Embodiment 2

Figure 8:
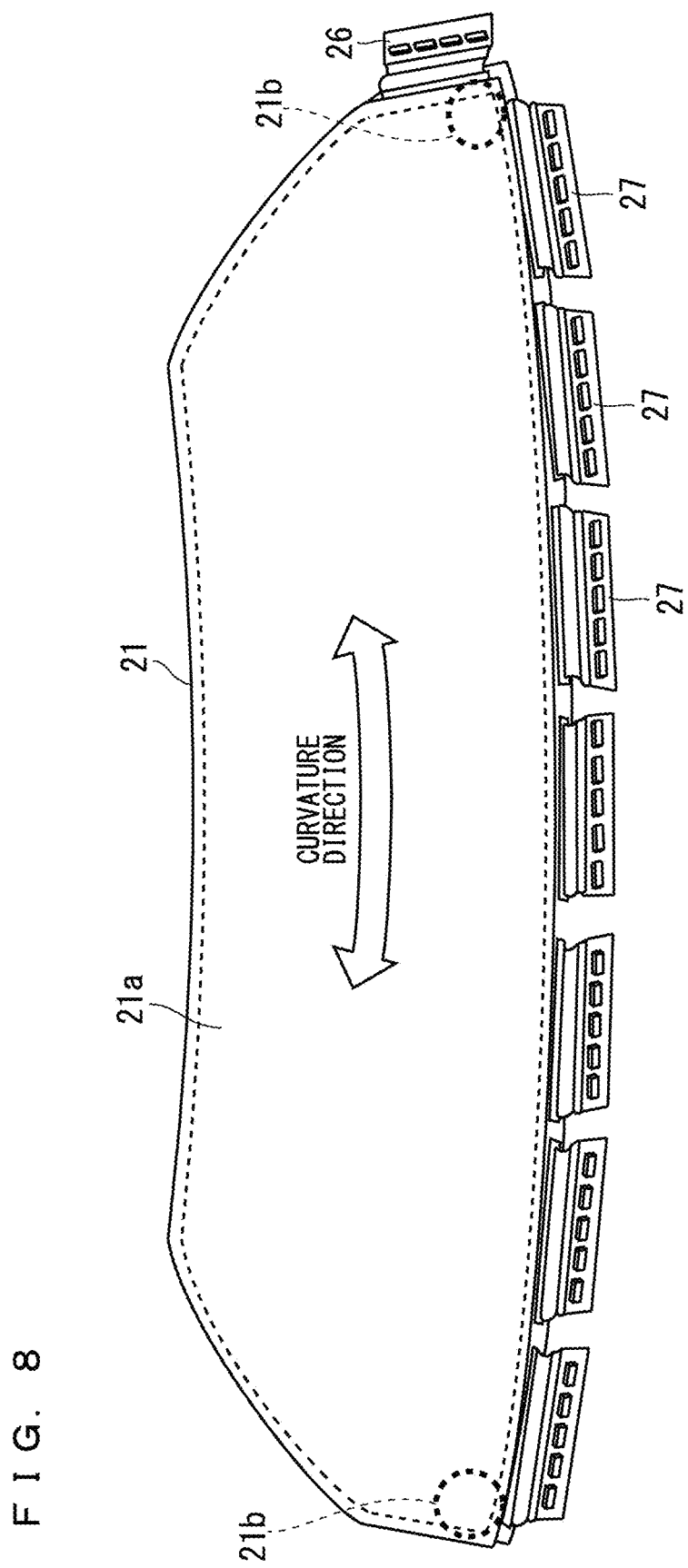
FIG. 8 is a perspective view schematically illustrating a configuration of a liquid crystal panel according to an embodiment 2.

FIG. 8 is a perspective view schematically illustrating a configuration of a liquid crystal panel 21 according to an embodiment 2 of the present invention. The same or similar reference numerals as those described above will be assigned to the same or similar constituent element in the configuration according to the present embodiment 2, and the different constituent elements are mainly described hereinafter. In the description hereinafter, the liquid crystal panel 21 is the liquid crystal panel of in-plane switching mode, however, the configuration is not limited thereto, thus any lateral electric field liquid crystal panel is applicable.

In the embodiment 1, the liquid crystal panel 21 has a rectangular shape in a plan view and includes the flat plate-like display surface in the manner similar to the general liquid crystal panel. Such a liquid crystal panel 21 does not have a specific tendency in the occurrence of the stress unevenness (black floating), thus in the embodiment 1, the black floating inspection process of specifying the presence or absence of the occurrence of the stress unevenness (black floating) and the occurrence area is performed halfway through the manufacturing process.

In the meanwhile, when the liquid crystal panel has a polygonal shape other than a rectangular shape or a non-rectangular shape which is an outer shape including a curved shape in at least part thereof in a plan view or has a curvature in a cross-sectional view, a specific tendency is recognized in the occurrence of the stress unevenness (black floating). Accordingly, when the liquid crystal panel has such a shape, the stress unevenness (black floating) occurring in accordance with the stress occurs in a specific area in many cases.

In consideration of this condition, the liquid crystal panel 21 included in the liquid crystal display device according to the present embodiment 2 has at least one of the non-rectangular shape and the curvature, and the local area described in the embodiment 1 falls under a predetermined specific area. As illustrated in FIG. 8, described hereinafter is an example of a case where the liquid crystal panel 21 according to the present embodiment 2 is included in a non-rectangular curved liquid crystal display device and has both the non-rectangular shape and curvature.

The non-rectangular curved liquid crystal display device has a feature of the non-rectangular liquid crystal display device including the liquid crystal panel with the non-rectangular shape and a feature of the curved liquid crystal display device including the liquid crystal panel with the curvature. In the liquid crystal panel 21 in FIG. 8 included in the non-rectangular curved liquid crystal display device, a noticeable specific stress distribution having a large stress occurs in accordance with the non-rectangular outer shape, thus there is a strong tendency that the stress unevenness (black floating) also occurs in the specific area.

FIG. 8 illustrates not only the liquid crystal panel 21 but also a display surface 21a, a specific area 21b, a gate drive circuit substrate 26, and a source drive circuit substrate 27 of the liquid crystal panel 21. The gate drive circuit substrate 26 is a circuit included in the liquid crystal display device, and is a circuit generating the signal being input to the scan wiring 2 in FIG. 2. The source drive circuit substrate 27 is a circuit included in the liquid crystal display device, and is a circuit generating the signal being input to the signal wiring 1 in FIG. 2.

Also in the liquid crystal display device according to the present embodiment 2, each orientation such as the absorption axis direction of the array side polarization plate is set as illustrated in FIG. 4 in the manner similar to each orientation of the liquid crystal display device according to the embodiment 1. Accordingly, also in the liquid crystal panel 21 according to the present embodiment 2, the absorption axis direction of one of the pair of the polarization plates 25a and 25b and the orientation axis direction of the liquid crystal to which the electric field is not applied do not completely coincide with each other in the manner similar to the liquid crystal panel 21 according to the embodiment 1.

That is to say, the orientation axis direction of the liquid crystal 24a in the state where the voltage is not applied is slightly shifted from the absorption axis direction of one of the polarization plates of the pair of the polarization plates 25a and 25b in a direction opposite to a direction in which the orientation axis direction of the liquid crystal 24a is rotated in the state where the voltage is applied. Thus, also in the liquid crystal panel 21 according to the present embodiment 2, as shown by the solid line in V-T characteristics in FIG. 5, the transmissivity of the liquid crystal panel 21 has a local minimum value when the voltage applied to the liquid crystal 24a has a value other than 0.

Then, the liquid crystal display device according to the present embodiment 2 applies the voltage A (first voltage) in FIG. 7 as the drive voltage to the liquid crystal 24a in the local area when the transmissivity of the local area is set to the predetermined local minimum value, and applies the voltage B (second voltage) in FIG. 7 as the drive voltage to the liquid crystal 24a in the remaining area other than the local area when the transmissivity of the remaining area is set to the predetermined local minimum value, in the manner similar to the embodiment 1. The voltage A is different from the voltage B.

<Description of Manufacturing Method>

Described subsequently is a method of specifying a specific area in the method of manufacturing the liquid crystal display device and the liquid crystal panel 22 according to the present embodiment 2 described above.

Firstly, a sample panel which is the same as the liquid crystal panel 21 is prepared as a sample of the liquid crystal panel 21 according to the embodiment 2. The sample panel has the same non-rectangular shape and curvature as the liquid crystal panel 21, and the same optical design as that of the liquid crystal panel 21 is applied to the sample panel.

The black floating inspection process and the determination process of determining the optimal black display voltage described in the embodiment 1 are performed on the sample panel in sequence. Accordingly, the occurrence area in the sample panel having the same design as the liquid crystal panel 21 is specified as the specific area, and the optimal black display voltage for resolving the black floating occurring in the specific area is determined.

In the meanwhile, as illustrated in FIG. 8, for example, generated are a plurality of liquid crystal panels in which both ends in a right-left direction which is a longitudinal direction are curved to get close to each other and a width which is a length between the both ends get smaller from a lower side toward an upper side of a short-side direction. In this case, there is a tendency that the occurrence areas are confirmed in both end portions in a lower side in the right-left direction in the plurality of liquid crystal panels with a certain degree of repeatability, and specific areas 21b are set in those positions. The optimal black display voltage for resolving the black floating in the specific are 21b also has a certain degree of repeatability. The repeatability described above is also established in the similar manner in some degree in the liquid crystal panel not having the curvature but having the non-rectangular shape and the liquid crystal panel not having the non-rectangular shape but having the curvature.

Thus, the liquid crystal panel 21 and the sample panel having at least one of the non-rectangular shape and the curvature also have the repeatability described above. Thus, once the data of the optimal black display voltage for resolving the black floating is obtained using the sample panel, the liquid crystal display device in which the in-plane distribution of the black luminance is suppressed can be manufactured with a high yield by making the data signal storage element in the liquid crystal display device including the liquid crystal panel 21 store the data.

Conclusion of Embodiment 2

According to the present embodiment 2 described above, the liquid crystal panel 21 has at least one of the non-rectangular shape and the curvature. The first voltage is applied as the voltage to the liquid crystal in the specific area when the transmissivity of the specific area is set to the predetermined local minimum value, and the second voltage is applied as the voltage to the liquid crystal in the remaining area other than the specific area when the transmissivity of the remaining area is set to the predetermined local minimum value. The first voltage is different from the second voltage. According to such a configuration, the minimization of the black luminance in the whole area in the liquid crystal panel 21 and the suppression of the in-plane distribution of the black luminance can be achieved in the manner similar to the embodiment 1.

According to the manufacturing method in the present embodiment 2, the sample panel which is the same as the liquid crystal panel 21 is prepared and the specific area is specified based on the distribution of luminance in the whole area in the case where the second voltage is applied to the liquid crystal in the whole area in the sample panel. Then, the first voltage is determined based on the change in the transmissivity of the specific area with respect to the change in the voltage applied to the liquid crystal in the specific area in the sample panel. According such a manufacturing method, the data of the occurrence area and optimal black display voltage obtained from the sample panel, whose repeatability is relatively large in the sample panel and the liquid crystal panel 21, can be used in the liquid crystal panel 21. Accordingly, the black floating inspection process and the determination process of determining the optimal black display voltage need not be performed separately on each liquid crystal panel 21 as is the case in the embodiment 1, thus the manufacturing process of the liquid crystal display device can be simplified.

According to the present invention, the above embodiments can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising
a liquid crystal panel of normally black system including
a liquid crystal layer with a liquid crystal, an electrode applying voltage to the liquid crystal, and a pair of polarization plates sandwiching the liquid crystal layer, wherein
when voltage is applied to the liquid crystal panel, an orientation axis direction of the liquid crystal rotates, along a first direction, from a first orientation direction, being a homogeneous orientation direction of the liquid crystal, towards a second orientation direction that is parallel to an absorption axis direction of one of the pair of polarization plates,
with voltage applied to the liquid crystal panel, there exists a local region having a minimum in transmissivity characteristic that occurs at a first voltage, and a remaining area of the liquid crystal panel having a minimum in transmissivity characteristic that occurs at a second voltage,
the local region and the remaining area are each operated at the respective minimum in transmissivity by applying the first voltage to the local region and the second voltage to the remaining area, and
the first voltage is different from the second voltage.

2. The liquid crystal display device according to claim 1, wherein
the liquid crystal panel has at least one of a non-rectangular shape or a curvature, and
the local area is a predetermined specific area of the liquid crystal.

3. A manufacturing method of manufacturing the liquid crystal display device according to claim 1, wherein
the local area is determined by applying the second voltage to a whole area of the liquid crystal panel and determining a distribution of luminance in the whole area of the liquid crystal panel.

4. A manufacturing method of manufacturing the liquid crystal display device according to claim 3, wherein
the first voltage is determined by a change in the transmissivity of the local area based on a change in the voltage applied to the local area of the liquid crystal.

5. A manufacturing method of manufacturing the liquid crystal display device according to claim 2, wherein
a sample panel, being identical to the liquid crystal panel, is prepared, and the specific area is specified based on a distribution of luminance in a whole area in the sample panel when the second voltage is applied to the liquid crystal in the whole area of the sample panel.

6. A manufacturing method of manufacturing the liquid crystal display device according to claim 5, wherein
the first voltage is determined by a change in the transmissivity of the specific area of the sample panel when a change in voltage is applied to the liquid crystal panel in the specific area of the sample panel.

7. The liquid crystal display device according to claim 1, wherein in a case where the voltage is not applied, the homogeneous orientation direction is a direction other than directions parallel to or perpendicular to the absorption axis direction of each of the pair of polarizing plates.

8. The liquid crystal display device according to claim 1, wherein the electrode includes only a first electrode and a second electrode that are aligned in one direction.

* * * * *